(No Model.)

J. C. LOVE.
CLEANING DEVICE FOR RAILWAY CONDUITS.

No. 511,341. Patented Dec. 26, 1893.

Inventor:
John C. Love.
By Dayton, Poole & Brown
Attys.

UNITED STATES PATENT OFFICE.

JOHN C. LOVE, OF PHILADELPHIA, PENNSYLVANIA, ASSIGNOR TO THE LOVE ELECTRIC TRACTION COMPANY, OF CHICAGO, ILLINOIS.

CLEANING DEVICE FOR RAILWAY-CONDUITS.

SPECIFICATION forming part of Letters Patent No. 511,341, dated December 26, 1893.

Application filed June 16, 1891. Serial No. 396,458. (No model.)

*To all whom it may concern:*

Be it known that I, JOHN C. LOVE, of Philadelphia, in the county of Philadelphia and State of Pennsylvania, have invented certain new and useful Improvements in Cleaning Devices for Railway-Conduits; and I do hereby declare that the following is a full, clear, and exact description thereof, reference being had to the accompanying drawings, and to the letters of reference marked thereon, which form a part of this specification.

This invention relates to improvements in cleaning and ventilating devices for electric railway conduits and consists in the matters hereinafter described and pointed out in the appended claims.

Figure 1:
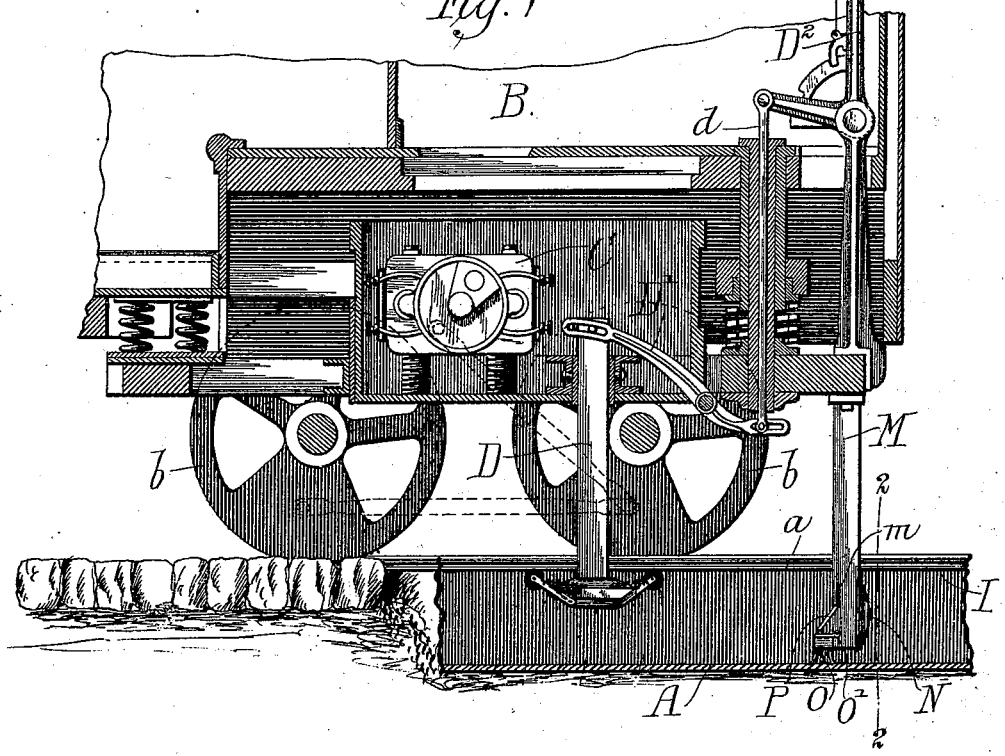
Figure 2:
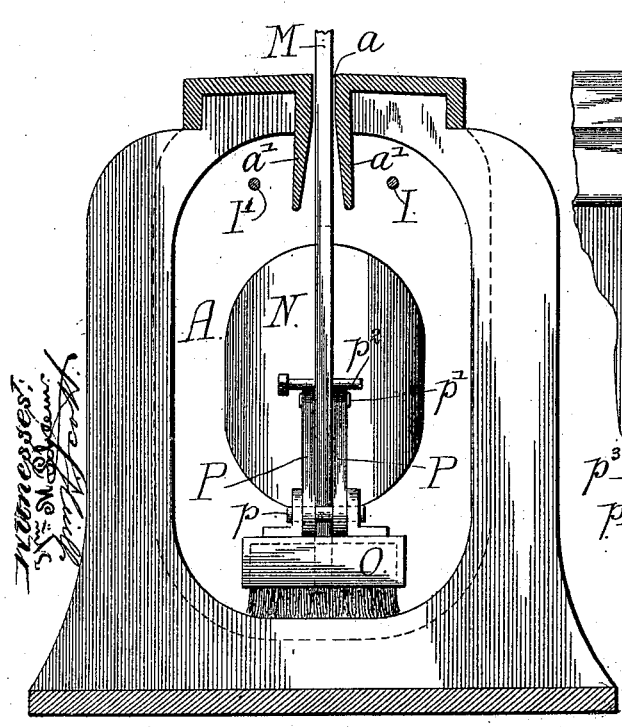
Figure 3:
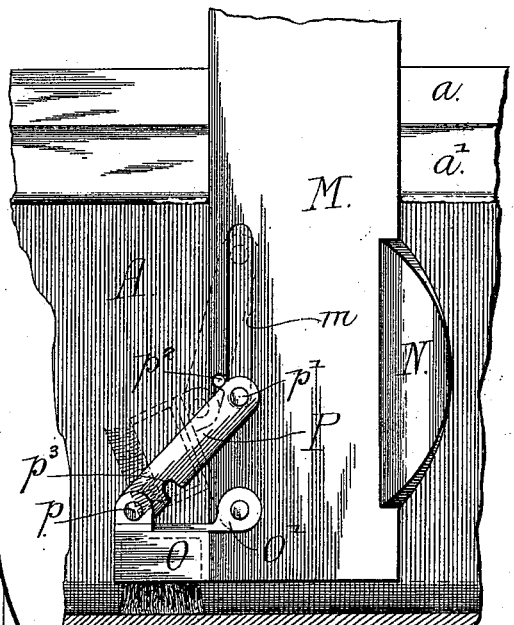

In the accompanying drawings illustrating my invention: Figure 1 is a view in central vertical section of the conduit and vehicle together with devices containing my invention. Fig. 2 is a cross-sectional view of the conduit taken upon line 2—2 of Fig. 1, showing in detail the ventilating and cleaning device. Fig. 3 is a side elevation view of the parts within the conduit shown in Fig. 2, the conduit being shown in longitudinal section.

As shown in said drawings, A indicates as a whole the conduit provided at its top with a longitudinal slot $a$ in the usual manner and B a vehicle provided with wheels $b$ $b$ which rest upon track rails.

The vehicle illustrated is similar to that shown in Letters Patent No. 381,396, dated April 17, 1888, and contains an electric motor C by means of which the wheels $b$ $b$ are driven.

D is a vertical bar connected with the vehicle B, and to the lower end of which the traveling contact device is attached; said bar D being made flat so as to pass through the slot $a$ of the conduit in the usual manner. Said bar D has vertically sliding connection with the vehicle and is connected at its upper end with a pivoted lever D' which lever is connected through the medium of the vertical connecting rod $d$ with a hand lever D² by which the said bar D and the contact device carried thereby may be raised and lowered.

Referring now to the cleaning and ventilating devices, M is a flat rigid bar attached to the frame of the vehicle and extending downwardly through the slot in the conduit to a point within the same. Attached to the said bar M is a transversely arranged plate N which occupies a considerable portion of the area of the conduit below the conducting wires therein, and in the forward movement of the vehicle, acts as a fan to push and move the air through the conduit and thus create a current tending to take up or evaporate moisture within the conduit and tending to keep the same dry. The bar M is also herein shown as provided with means for keeping clean the bottom of the conduit by sweeping accumulated dust and dirt therein along the conduit and into suitable depressions or receptacles adapted to receive it. As shown in the drawings, O is a brush or scraper attached to an arm O' which is pivoted near the lower end of the bar M in such manner that the brush may be swung upwardly out of operative position, as seen in dotted lines in Fig. 3. For holding the brush in contact with the bottom of the conduit, connecting bars P P are pivoted at $p$ to the outer end of the brush O and said bars are engaged at their upper ends with a pin $p'$ which passes through a vertical slot $m$ in the bar M. Said pin $p'$ rests in the lower end of the slot $m$ and supports the brush O in its horizontal position, the brush being held from rising at such time by a pin $p^2$ inserted through the bar M above the connecting bars P P in the manner shown, or by any other suitable locking device. When it is desired to lift and hold the brush out of action, the pin $p'$ is drawn upwardly through the slot $m$, as shown in dotted lines in Fig. 3, and the brush may be sustained in its uplifted position by any suitable device for the purpose, that herein shown consisting of notches $p^3$ in the connecting bars P which notches are arranged in position to be engaged by the pin $p^3$ at the time the said connecting bars are in their elevated position, as clearly seen in Fig. 3.

I claim as my invention—

1. A cleaning device for railway conduits, comprising a bar attached to the car and extending into the conduit through the slot thereof, a brush or scraper pivoted to the bar within the conduit, a link pivoted at one end to the free end of the brush or scraper and having at its other end a pivotal or sliding engagement with the bar, and means for locking said link at either limit of its movement, substantially as described.

2. A cleaning device for railway conduits, comprising a bar attached to the car and extending into the conduit through the slot thereof, a brush or scraper pivoted to the bar within the conduit, a link pivoted at one end to the free end of the brush or scraper and having at its other end a pin engaging a longitudinal slot in the bar, and means for locking the link at either end of the slot, substantially as described.

3. A cleaning and ventilating device for railway conduits comprising a bar attached to the car and extending into the conduit through the slot thereof, a brush on said bar within the conduit and a transverse plate attached to the bar within the conduit and acting to produce a current of air in the same, substantially as described.

In testimony that I claim the foregoing as my invention I affix my signature in presence of two witnesses.

JOHN C. LOVE.

Witnesses:
C. CLARENCE POOLE,
GEORGE W. HIGGINS, Jr.